June 10, 1952  W. J. DOELKER, JR., ET AL  2,600,220
COMPOSITE ARTICLE AND METHOD OF MAKING SAME
Filed Oct. 13, 1945

INVENTORS
WILLIAM J. DOELKER JR
AND JOHN M. HILDABOLT
BY
Spencer, Hardman & Fehr
THEIR ATTORNEYS Patented June 10, 1952

2,600,220

UNITED STATES PATENT OFFICE 2,600,220

COMPOSITE ARTICLE AND METHOD OF MAKING SAME

William J. Doelker, Jr., and John M. Hildabolt, Dayton, Ohio, assignors to General Motors Corporation, Detroit, Mich., a corporation of Delaware Application October 13, 1945, Serial No. 622,124

1 Claim. (Cl. 29—195)

This application is a continuation-in-part of Ser. No. 418,100, filed November 6, 1941, now abandoned, for Composite Article and Method of Making Same.

This invention relates to articles formed from plastics, and is more particularly concerned with reinforced composite articles including a portion or layer of plastic material mechanically locked to a strong metal support, and to the method of making such articles.

It is an object of the invention to provide a new article of manufacture comprising a layer of a plastic, a dense metal supporting back and an intermediate layer of porous metal bonded to the metal supporting back by an alloy bond and mechanically holding the plastic layer to the supporting back, wherein the supporting back is manually flexible.

Further objects and advantages of the present invention will be apparent from the following description, reference being had to the accompanying drawings wherein a preferred embodiment of the present invention is clearly shown.

Figure 1:
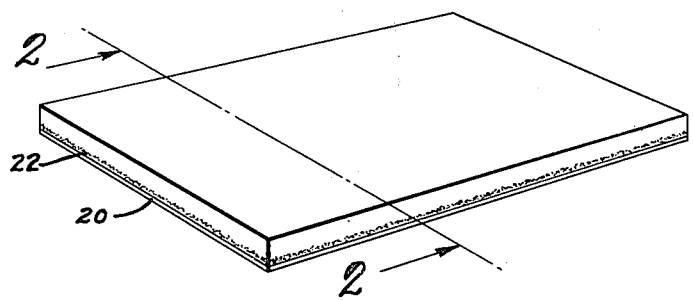
Fig. 1 shows a perspective view of a section of composite material.
Figure 2:
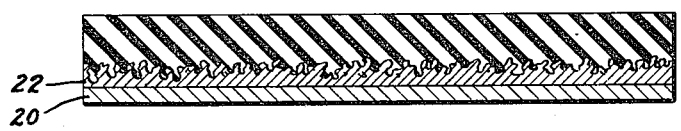
Fig. 2 is a sectional view taken on line 2—2 of Fig. 1.

In the past it has been particularly difficult to reinforce large flat surfaces of plastic materials such as thermal setting resins or thermal plastics etc., due to the fact that the plastic material would not adhere to smooth surfaces of metal with any degree of tenacity and upon bending, or flexing of the composite sheet, or thermal changes, the plastic layer pulls away from the metal. Reinforced articles of this type are particularly desirable. For example, seal rings for automobile water pumps and the like are often fabricated from thermal setting resins such as "Bakelite" and necessarily must stand high loading pressures. Likewise, interior parts of automobiles may be fabricated from plastic material, as well as many other commercial applications which are well known. In each instance it would be desirable to reinforce the article with a strong metal backing if it were possible to obtain a bond between the plastic and the metal which will be maintained during flexing, such as manual flexing or flexing due to thermal changes which cause unequal expansion or contraction of the plastic and metal backing. Similarly, table tops, desk tops and the like formed from plastics are attractive and desirable with the exception that they are easily broken at the corners and edges thereof if not provided with a strong reinforcing backing, and when simply cemented to such a reinforcing member will break away upon flexing thereof.

This invention proposes the use of a porous metal layer or coating metallurgically bonded to a strong metal reinforcing element, which layer includes pores therein that in many cases extend entirely through the porous metal layer into contact with the supporting element. These pores are not regular in shape and have re-entrant angles therein. When plastic material is molded under pressure upon this porous metal layer, the plastic tends to flow into the pores, and upon setting these portions act as tentacles for firmly anchoring the plastic layer to the porous metal and to the strong metal element. We have found that by preparing metal in accordance with our invention, phenolformaldehyde resins such as "Bakelite," urea-formaldehyde resins, polystyrene, Vinylite and other types of plastics are easily and inexpensively attached thereto, and the composite articles formed are vastly superior to any other articles of like type which use cemented bonds.

In preparing sheet metal for subsequent use as a backing material for a plastic, the strong metal backing 20 is thoroughly cleaned, and then the powdered metal in the form of bronze powder, copper and tin powders, copper and nickel powders, etc., is applied thereto in a thin uniform substantially non-compacted layer. This assembly is then heated under non-oxidizing conditions at a temperature intermediate the melting points of the metallic components of the metal powder for periods of time varying from ten to thirty minutes. The sheet is next cooled under non-oxidizing conditions, and then includes a porous metal layer 22 bonded to the backing 20. Further particulars as to the exact time, temperatures etc. used in bonding metal powders to strong metal backs may be found in the Koehring Patent, No. 2,198,253.

The prepared backing material is next placed in a mold, and plastic material in suitable form is filled therein upon the porous metal surface of the backing 20. This granular material may include inert fillers, or if desired, may include metal powder mixed therewith, for example copper powder, nickel powder or aluminum powder, etc. in varying proportions, which conditions the surface of the plastic for anti-frictional purposes and likewise is very effective as a decorative medium. For example, on a table top, the inclusion of metal powders, such as nickel powder, enhances the appearance of the table top as well as functioning as a means for preventing excessive scratching of the top when articles are slid thereover.

After the plastic material has been filled into the mold, pressure is preferably applied thereto, and the mold and contents are heated to a temperature (preferably from 300° to 350° F. for Bakelite) at which time the material is sufficiently plastic to flow under the pressure exerted thereon into the pores and crevices of the pores of the porous metal layer, while simultaneously the plastic layer is sized and smoothed. Variations in the times, temperatures and pressures utilized form no part of the present invention and are well known in the art. The completed article is then removed from the mold either in its ultimate shape or in sheets etc. which may be cut to size. Obviously the pressure, temperature and time of the treatment may vary in accordance with the type of plastic used as is well known in the art.

Another modification which is preferably used when operating on thermoplastics contemplates the preforming of the thermoplastic into, for example, sheet material. This pre-formed layer is superimposed upon the rough sintered metal surface of the reenforcing layer, and is fixedly attached thereto by the application of high pressure with the aid of a slightly elevated temperature. Cellulose acetate and other thermoplastics may be easily attached to reenforcing members by following this procedure.

When the term plastic is used herein, it is to be understood to include only non-metallic plastics such as any of the thermosetting resins or the thermoplastics, such compounds including; cellulose acetate, pyroxylin, phenol formaldehyde resins, caesin compounds, urea formaldehyde resins and other similar compounds.

Specific examples of various materials used for making the porous metal layer are as follows:

*Example I*

When a bronze porous metal layer is desired a mixture of metal powders containing 90% copper and 10% tin powder is spread in a loose non-compacted layer on the surface of a steel supporting member which metal powder upon the steel is then sintered at a temperature of from 1500 to 1700° F. from a period of from 15 minutes to 45 minutes under non-oxidizing conditions; the material is next cooled under suitable atmospheric conditions to prevent oxidation and is ready for use in connection with the plastic. In this case, the porous layer now approximates a bronze having a 90% copper, 10% tin analysis, which bronze layer is highly porous and is bonded to the surface of the steel.

*Example II*

If a copper nickel alloy layer is desired on the steel, a mixture of 50 parts copper and 50 parts nickel may be spread in a loose non-compacted layer upon the surface of a steel strip and then sintered under non-oxidizing conditions at a temperature from 1850 to 2050° F. for a period of from one minute to one hour, which metal is next cooled under suitable atmospheric conditions and presents a porous alloy layer bonded to the steel metallurgically, the layer comprising an alloy of copper nickel.

*Example III*

If an alloy layer approximating Monel metal is desired, 60 to 65 parts of nickel powder are mixed with 40 to 35 parts of copper powder which mixture is spread in a uniform layer in the loose non-compacted condition upon the surface of a steel strip. The assembly is heated under non-oxidizing conditions at a temperature ranging from 2000 to 2100° F. for a period of from 1 minute to 45 minutes after which the sintered layer which is bonded to the steel is cooled under suitable atmospheric conditions.

*Example IV*

Another copper nickel mixture which may be used consists in a mixture of copper and nickel powder in proportions of 95% copper, 5% nickel. This mixture is spread in the non-compacted condition upon the surface of a steel strip and the assembly is heated at a temperature of from 1850 to 1950° F. for a period ranging from one-half hour to 24 hours under non-oxidizing conditions; after cooling under suitable atmospheric conditions, the layer comprises a highly porous cuprous layer having 5% nickel alloyed therewith.

*Example V*

Another type of porous metal layer may be fabricated by mixing 80 parts iron powder with 20 parts of copper powder, which mixture is spread in the loose non-compacted condition upon the surface of a steel strip and sintered at a temperature of from 2000 to 2100° F. for a period of from 1 minute to 45 minutes under non-oxidizing conditions. The sintered ferrous layer which is bonded through the medium of the copper to the steel backing is then cooled under suitable atmospheric conditions and presents a highly porous metal layer which is metallurgically attached to the steel.

It is to be understood that in all the examples described herein the surfaces of the steel may be copper plated to facilitate the bonding action; however, if the steel is clean and free from oxide coating, oil and dirt, etc., the metal powders will bond thereto satisfactorily without the use of the copper plate. It should further be understood that the proportions of metal powder, sintering times and temperatures etc., may be varied within limits without effecting the success of the invention. From these examples it is manifest that when sintering a mixture of two metal powders having two different melting points wherein the highest melting powder is predominant, a sintering temperature is preferably employed intermediate the melting points of the two powders. However, when a single metal powder is used or when the lowest melting point powder is predominant, it is best to maintain the sintering temperature slightly below the melting point of the predominating metal powder of the single metal powder. In this connection, a longer sintering time is desirable to assure diffusion and/or grain growth.

The sintering as mentioned in this disclosure is that type of sintering wherein no appreciable fusion takes place. In other words, the term sintering is used in a powder metallurgical sense.

Still another modification of the invention contemplates the dissolving of the plastic in a solvent, the dissolved plastic then being sprayed, brushed or flowed onto the porous metal layer according to the consistency of the solution. In the case of thermoplastics, such as pyroxylin, the material may be air dried to evaporate the solvent, at which time the plastic layer will be firmly attached to the metal back. Any desired thickness of plastic layer may be applied by forming the sheet metal with the porous metal layer thereon into a shallow tray-like structure or by some similar expedient such as by the use of removable side walls.

This invention basically is directed to the elimination of poor bonds between plastics and metal reenforcing elements which are sufficiently thin to be flexed during use. As previously stated, this flexing will cause a fracture in cemented bonds whereby the reenforcement is lost. Table tops and other large area surfaces, thermostatic members, seal rings etc., are all placed under a bending or flexing strain during use wherein the present article with its superior mechanical bond maintains the interlock between the juxtaposed surfaces of the plastic and the reinforcing member. The terms "manual flexing" or "manually flexible" are used in the sense that the part or article is of such relative size and of cross section to permit flexing of an order that would tend to disrupt a cement bond.

While the embodiment of the present invention as herein disclosed, constitutes a preferred form, it is to be understood that other forms might be adopted, all coming within the scope of the claim which follows.

What is claimed is as follows:

A new article of manufacture in sheet form, for use as a table and desk top consisting of a laminated structure comprising in combination, a substantially flat relatively large area manually flexible sheet of dense metal, a layer of highly porous metal made by sintering together non-compacted metal powder bonded directly to said sheet and substantially coextensive therewith, and a juxtaposed layer of phenol formaldehyde condensation product covering said porous metal layer and having portions thereof extending into the pores of the porous metal layer for mechanically anchoring the phenol formaldehyde condensation product to the dense metal sheet, whereby the phenol formaldehyde layer is maintained in juxtaposed position during flexing of the dense metal sheet through mechanical anchorage to the porous metal layer.

WILLIAM J. DOELKER, Jr.
JOHN M. HILDABOLT.

REFERENCES CITED

The following references are of record in the file of this patent:

UNITED STATES PATENTS

| Number | Name | Date |
| --- | --- | --- |
| 1,216,154 | Meadway | Feb. 13, 1917 |
| 1,412,326 | Williams | Apr 11, 1922 |
| 1,844,572 | Mains | Feb. 9, 1932 |
| 2,039,069 | Domm | Apr. 28, 1936 |
| 2,117,085 | Ensminger | May 10, 1938 |
| 2,184,179 | Domm | Dec. 19, 1939 |
| 2,187,086 | Koehring | Jan. 16, 1940 |
| 2,342,278 | Herrmann | Feb. 22, 1944 |